United States Patent
Sheng et al.

(10) Patent No.: US 7,978,381 B2
(45) Date of Patent: Jul. 12, 2011

(54) AUTOMATIC DOCUMENT FEEDER WITH MECHANISM TO DISCRIMINATE DOCUMENT TYPES

(75) Inventors: Kung-Cho Sheng, Taipei (TW); Chang-Yung Feng, Taipei (TW)

(73) Assignee: Primax Electronics Ltd., Taipei (TW)

( * ) Notice: Subject to any disclaimer, the term of this patent is extended or adjusted under 35 U.S.C. 154(b) by 1051 days.

(21) Appl. No.: 11/767,670

(22) Filed: Jun. 25, 2007

(65) Prior Publication Data

US 2008/0266621 A1  Oct. 30, 2008

(30) Foreign Application Priority Data

Apr. 24, 2007  (TW) ............................... 96114348 A (51) Int. Cl.
*H04N 1/04* (2006.01)
(52) U.S. Cl. ......... 358/498; 358/406; 358/504; 358/1.9; 347/14; 347/17; 347/19; 347/101; 347/105; 399/23; 399/45; 399/389
(58) Field of Classification Search .................. 358/496, 358/498, 406, 504, 1.9; 347/14, 16, 19, 17, 347/101, 105, 106; 399/23, 45, 389; 369/53.22; 250/559.07, 559.11; 271/265.04
See application file for complete search history.

(56) References Cited

U.S. PATENT DOCUMENTS

| | | | | |
|---|---|---|---|---|
| 4,540,887 | A * | 9/1985 | Minerd et al. ............. | 250/559.4 |
| 5,604,609 | A * | 2/1997 | Seguchi et al. ............... | 358/488 |
| 5,764,251 | A * | 6/1998 | Hashimoto ..................... | 347/16 |
| 6,217,168 | B1 * | 4/2001 | Elgee ............................ | 347/105 |
| 6,386,669 | B1 * | 5/2002 | Scofield et al. ................. | 347/14 |
| 6,520,614 | B2 * | 2/2003 | Kaneko ........................... | 347/14 |
| 6,713,775 | B2 * | 3/2004 | Chelvayohan et al. .. | 250/559.16 |
| 7,073,789 | B2 * | 7/2006 | Suzuki ..................... | 271/265.04 |
| 7,144,008 | B2 * | 12/2006 | Suzuki ..................... | 271/265.04 |
| 7,397,747 | B2 * | 7/2008 | Kikuchi et al. ............ | 369/53.22 |
| 7,578,500 | B2 * | 8/2009 | Tsuchida ...................... | 271/171 |
| 7,675,051 | B2 * | 3/2010 | Ohta et al. ................. | 250/559.3 |

* cited by examiner

*Primary Examiner* — Twyler Haskins
*Assistant Examiner* — Dennis Dicker
(74) *Attorney, Agent, or Firm* — Kirton & McConkie; Evan R. Witt (57) ABSTRACT

An automatic document feeder includes an input tray, a transfer path, a roller assembly, an ejecting tray, a light emitter, a light receiver, a comparator and a discriminating unit. The light emitter successively emits multiple light beams of different intensities to the document. When the multiple light beams penetrating through the document are received by the light receiver, the light receiver outputs corresponding voltage signals. The discriminating unit is electrically connected to the light receiver for discriminating document types according to the voltage levels of the voltage signals.

10 Claims, 6 Drawing Sheets

AUTOMATIC DOCUMENT FEEDER WITH MECHANISM TO DISCRIMINATE DOCUMENT TYPES

FIELD OF THE INVENTION

The present invention relates to an automatic document feeder, and more particularly to an automatic document feeder having a mechanism of automatically discriminating document types.

BACKGROUND OF THE INVENTION

Recently, an automatic document feeder is used for successively feeding many documents at a time. The common documents to be fed include slides, plain papers and photo papers, which are arranged in ascending order of thickness. As known, the feeding performance of the automatic document feeder is mainly dependent on document types. For recognizing and distinguishing different document types, an automatic document feeder having a mechanism for recognizing document types has been developed.

Figure 1:
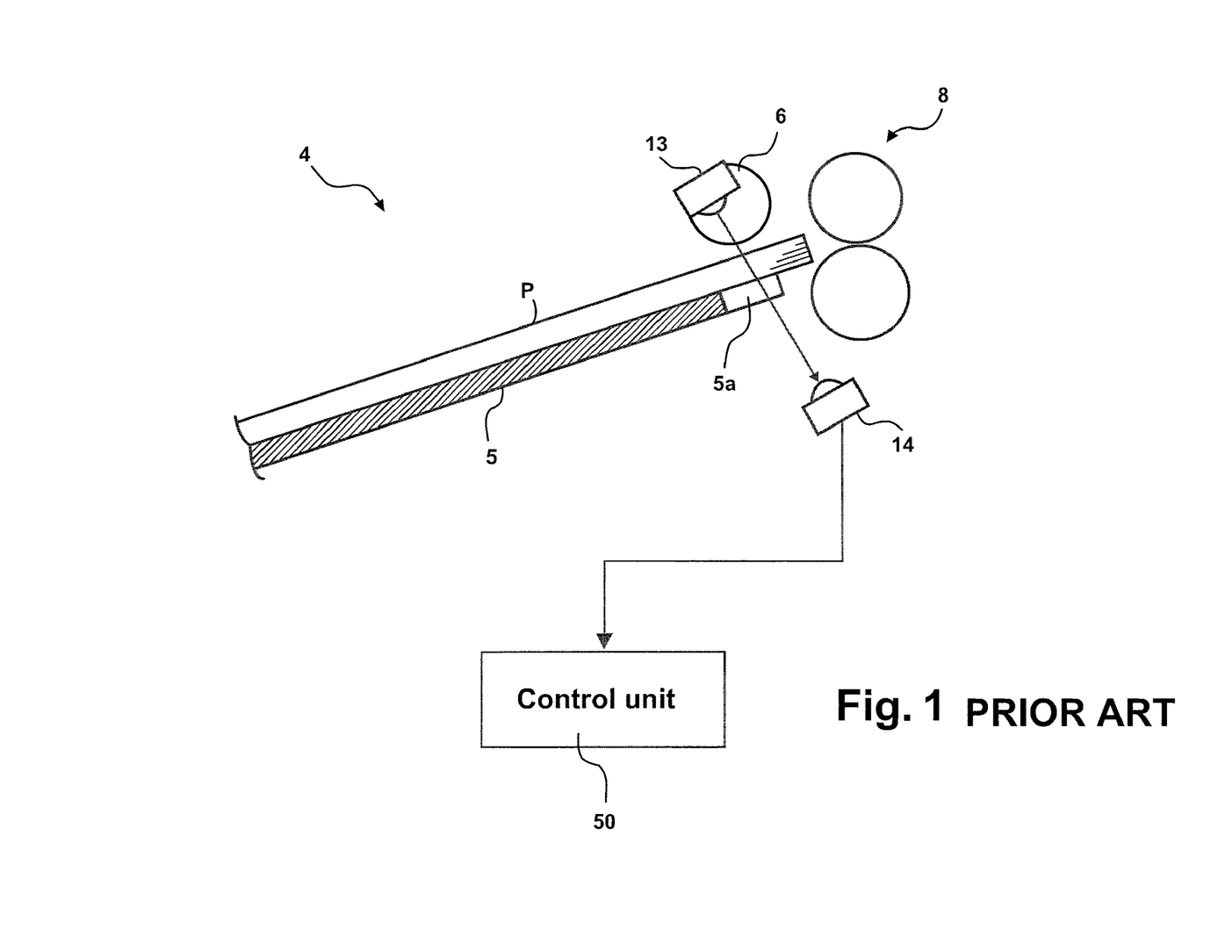
FIG. 1 is a schematic cross-sectional view of a conventional automatic document feeder.

Referring to FIG. 1, a schematic cross-sectional view of a conventional automatic document feeder is illustrated. The automatic document feeder 4 principally includes an input tray 5, a pick-up roller 6 and a separation roller assembly 8. A document P is placed on the input tray 5. The input tray 5 has a perforation 5a. The pick-up roller 6 and the separation roller assembly 8 are disposed beside the input tray 5. In addition, a light emitter 13 and a light receiver 14 are disposed on opposite sides of the perforation 5a. The light receiver 14 is electrically connected to a control unit 50.

Generally, after the document P to be fed into the automatic document feeder 4 is placed on the input tray 5, the pick-up roller 6 transports the document P forwardly into a feeding path (not shown). The use of the separation roller assembly 8 assures that a single piece of document is picked to feed into the feeding path. In addition, the perforation 5a, the light emitter 13, the light receiver 14 and the control unit 50 cooperate to discriminate the type of the document P. The light emitter 13 may emit a light beam having several different intensities.

Before the document P is fed into the feeding path of the automatic document feeder 4, a single high-intensity light beam generated from the light emitter 13 successively penetrates through the document P and the perforation 5a, and is then received by the light receiver 14. During the high-intensity light beam penetrates through the document P, a small portion of energy contained in the high-intensity light beam is absorbed by the document P and another small portion of the high-intensity light beam is reflected by the document P. Consequently, the energy of the high-intensity light beam is diminished upon being received by the light receiver 14. Moreover, as the thickness of the document P is increased, the energy of the high-intensity light beam received by the light receiver 14 is reduced. Afterwards, the type of the document P is discriminated by the control unit 50 according to the energy of the high-intensity light beam received by the light receiver 14. Generally, the amount of the light beam energy is converted into a corresponding voltage value.

For discriminating the type of the document P, a series of experiments concerning the relationships of voltage values and document types are carried out to obtain a look-up table in advance. The look-up table is then built in the control unit 50. Take three document types (e.g. a slide, a plain paper and a photo paper) for example. In a case that the voltage value of the light beam received by the light receiver 14 is ranged from a first threshold value to a second threshold value, the document P is deemed as a slide. In another case that the voltage value of the light beam received by the light receiver 14 is ranged from the second threshold value to a third threshold value, the document P is deemed as a plain paper. In a further case that the voltage value of the light beam received by the light receiver 14 is ranged from the third threshold value to a fourth threshold value, the document P is deemed as a photo paper.

In some instances, the intensity of the light beam generated from light emitter 13 is adjustable. For example, if the high-intensity light beam penetrates through a very thin document (e.g. a slide), the energy of the high-intensity light beam which is absorbed and reflected by the thin document is very tiny. As a consequence, the energy of the high-intensity light beam received by the light receiver 14 is very close to that issued from the light emitter 13. Under this circumstance, the control unit 50 fails to accurately distinguish the document type. For solving this problem, the intensity of the light beam should be adjusted to a lower level. Similarly, after the low-intensity light beam penetrating through the thin document is received by the light receiver 14, the control unit 50 may analyze the energy of the low-intensity light beam received by the light receiver 14 so as to discriminate the document type.

Although the conventional automatic document feeder 4 has the function of discriminating document types, there are still some drawbacks. For example, since the light beam energy needs to be precisely analyzed, the circuitry of the control unit 50 becomes more complicated and thus the control unit 50 is not cost-effective.

Therefore, there is a need of providing an automatic document feeder having a mechanism of automatically discriminating the document type in a simplified and cost-effective manner.

SUMMARY OF THE INVENTION

It is an object of the present invention to provide an automatic document feeder having a mechanism of automatically discriminating document types by successively emitting multiple light beams of different intensities on the same document.

In accordance with an aspect of the present invention, there is provided an automatic document feeder for feeding a document. The automatic document feeder includes an input tray, a transfer path, a roller assembly, an ejecting tray, a light emitter, a light receiver and a discriminating unit. The input tray is used for placing the document thereon. The transfer path severs as a passageway of the document. The roller assembly is used for transporting the document through the transfer path. The ejecting tray is used for supporting the document ejected from the transfer path. The light emitter successively emits multiple light beams of different intensities to the document. The light receiver is electrically connected to the light emitter for receiving the multiple light beams penetrating through the document, and outputting corresponding voltage signals, wherein the voltage signals have a first voltage level and a second voltage level. The discriminating unit is electrically connected to the light receiver for discriminating document types. The discriminating unit has been previously stored therein a look-up table concerning the relationships between a high voltage reference value, a low voltage reference value and the document types. If the first voltage level is greater than the high voltage reference value and the second voltage level is smaller than the low voltage reference value, the document is discriminated as a first document type by the discriminating unit. If the first voltage level and the second voltage level are both greater than the high voltage reference value, the document is discriminated as a second document type by the discriminating unit. If the first voltage level and the second voltage level are both smaller than the low voltage reference value, the document is discriminated as a third document type by the discriminating unit.

In an embodiment, the first document type is a plain paper, the second document type is a slide, and the third document type is a photo paper.

Preferably, the light emitter is a light emitting diode (LED) or an infrared light emitter.

Preferably, the light receiver is a photo transistor.

In accordance with another aspect of the present invention, there is provided an automatic document feeder for feeding a document. The automatic document feeder includes an input tray, a transfer path, a roller assembly, an ejecting tray, a light emitter, a light receiver, a comparator and a discriminating unit. The input tray is used for placing the document thereon. The transfer path severs as a passageway of the document. The roller assembly is used for transporting the document through the transfer path. The ejecting tray is used for supporting the document ejected from the transfer path. The light emitter successively emits multiple light beams of different intensities to the document. The light receiver is electrically connected to the light emitter for receiving the multiple light beams penetrating through the document. The comparator is electrically connected to the light receiver and outputs corresponding logic level signals in response to reception of the light beams by the light receiver, wherein the logic level signals have a first logic level and a second logic level. The discriminating unit is electrically connected to the comparator for discriminating document types. The discriminating unit has been previously stored therein a look-up table concerning the relationships between a high logic value, a low logic value and the document types. If the first logic level is equal to the high logic value and the second logic level is equal to the low logic value, the document is discriminated as a first document type by the discriminating unit. If each of the first logic level and the second logic level is equal to the high logic value, the document is discriminated as a second document type by the discriminating unit. If each of the first logic level and the second logic level is equal to the low logic value, the document is discriminated as a third document type by the discriminating unit.

In an embodiment, the first document type is a plain paper, the second document type is a slide, and the third document type is a photo paper.

Preferably, the light emitter is a light emitting diode (LED) or an infrared light emitter.

Preferably, the light receiver is a photo transistor.

In accordance with a further aspect of the present invention, there is provided a method for discriminating a type of a document to be fed into an automatic document feeder. Firstly, multiple light beams of different intensities are successively emitted to the document, wherein the multiple light beams include a first intensity light beam and a second intensity light beam. By detecting whether the light beams penetrate through the document, the document type is discriminated. If the first intensity light beam penetrates through the document but the second intensity light beam is impenetrable to the through the document, the document is discriminated as a first document type. If both of the first intensity light beam and the second intensity light beam penetrate through the document, the document is discriminated as a second document type. If both of the first intensity light beam and the second intensity light beam are impenetrable to the through the document, the document is discriminated as a third document type.

In an embodiment, the first document type is a plain paper, the second document type is a slide, and the third document type is a photo paper.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
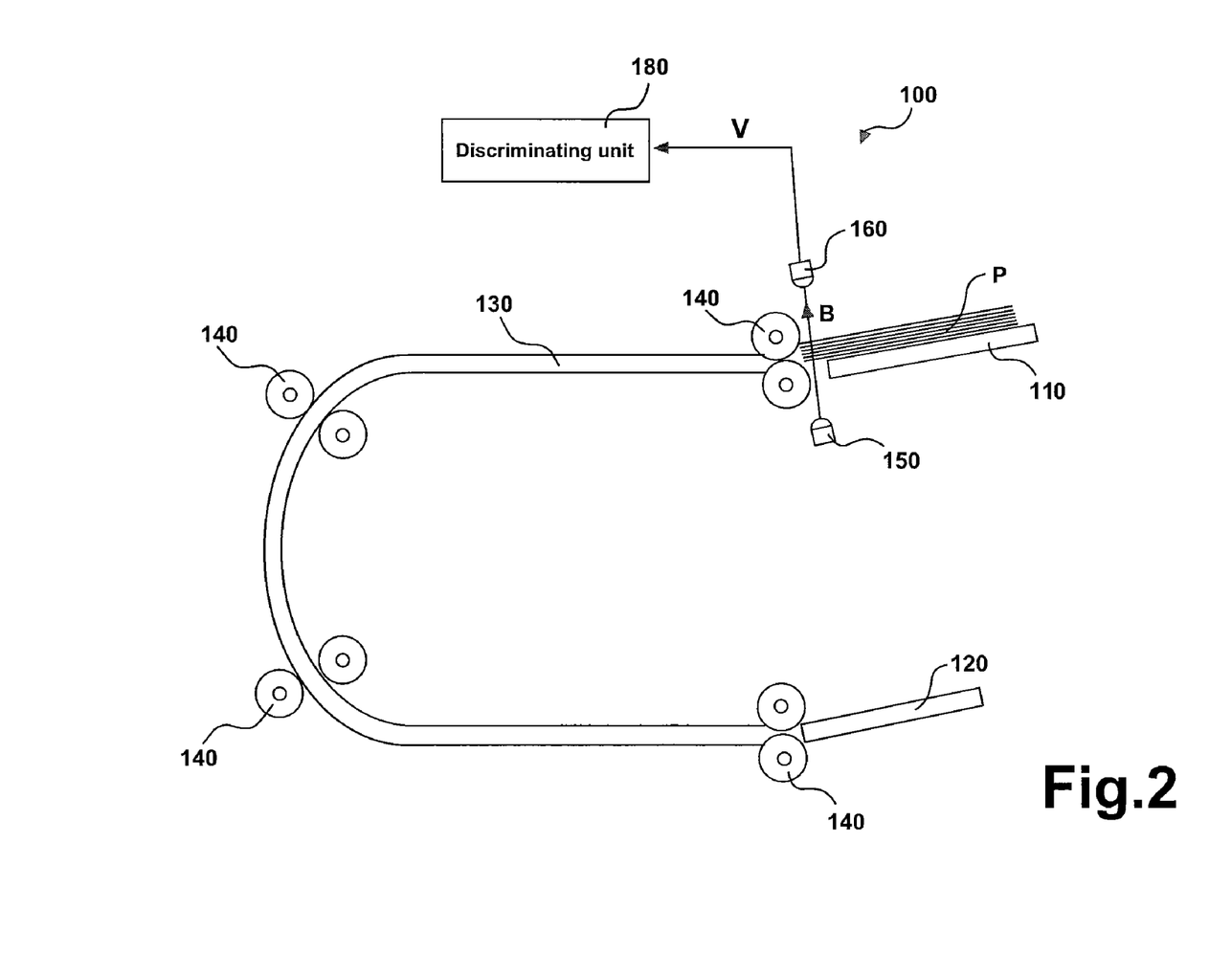
FIG. 2 is a schematic cross-sectional view of an automatic document feeder according to a first preferred embodiment of the present invention.

Referring to FIG. 2, a schematic cross-sectional view of an automatic document feeder according to a first preferred embodiment of the present invention is illustrated. The automatic document feeder 100 principally includes an input tray 110, an ejecting tray 120, a transfer path 130, several roller assemblies 140, a light emitter 150, a light receiver 160 and a discriminating unit 180. The roller assemblies 140 include a pick-up roller assembly, a separation roller assembly, a transfer roller assembly and an ejecting roller assembly. A high voltage reference value and a low voltage reference value have been previously stored in the discriminating unit 180. The documents to be fed into the automatic document feeder 100 include any sheet-like documents such as slides, plain papers, photo papers, and so on. An exemplary light emitter 150 includes for example a light emitting diode (LED) or an infrared light emitter. An example of the light receiver 160 is a photo transistor.

The light emitter 150 and the light receiver 160 are arranged in the vicinity of the input tray 110 and the inlet of the transfer path 130. After the document P is placed on the input tray 110, the roller assemblies 140 transport the document P forwardly into the transfer path 130. During the document P is fed into the transfer path 130, the light beam B generated from the light emitter 150 is projected onto the document P. Depending on the type of the document P, the light beam B penetrates through the document P or is reflected by the document P. In a case that the document P is transparent, the light beam B penetrates through the document P to be received by the light receiver 160. In another case that the document P is opaque, the light beam B is reflected by the document P and thus fails to be received by the light receiver 160. Regardless of whether the light beam B is received by the light receiver 160, a voltage signal V is transmitted from the light receiver 160 to the discriminating unit 180. If the light beam B is received by the light receiver 160, the voltage level of the voltage signal V is greater than the high voltage reference value. Whereas, if light beam B is not received by the light receiver 160, the voltage level of the voltage signal V is smaller than the low voltage reference value.

For discriminating the document type, a series of experiments concerning the relationships of voltage values and document types are carried out to obtain a look-up table in advance. The look-up table has been previously stored in the discriminating unit 180. An exemplary look-up table is illustrated as follows.

TABLE 1

| First voltage signal | Second voltage signal | Document type |
| --- | --- | --- |
| <low voltage reference value | <low voltage reference value | Photo paper |
| >high voltage reference value | <low voltage reference value | Plain paper |
| >high voltage reference value | >high voltage reference value | Slide |

In this embodiment, the light emitter 150 may generate a high-intensity light beam and a low-intensity light beam. In response to the high-intensity light beam and the low-intensity light beam, the light receiver 160 outputs a first voltage signal and a second voltage signal to the discriminating unit 180, respectively. The high voltage reference value, the low voltage reference value and the look-up table have been previously stored in the discriminating unit 180. As shown in Table 1, a plain paper, a slide and a photo paper are indicated as a first document type, a second document type and a third document type, respectively.

When the document P enters the illumination field of the light emitter 150, a high-intensity light beam generated from the light emitter 150 penetrates through the document P and the penetrative light beam is received by the light receiver 160. When the penetrative light beam is received by the light receiver 160, a first voltage signal is outputted to the discriminating unit 180. By comparison, the discriminating unit 180 realizes that the voltage level of the first voltage signal is greater than the high voltage reference value. Subsequently, a low-intensity light beam is generated from the light emitter 150. If the low-intensity light beam fails to be received by the light receiver 160, a second voltage signal is outputted to the discriminating unit 180. By comparison, the discriminating unit 180 realizes that the voltage level of the second voltage signal is smaller than the low voltage reference value. According to the look-up table, the document P is discriminated as a plain paper (i.e. the first document type) by the discriminating unit 180.

On the other hand, if the high-intensity light beam and the low-intensity light beam may penetrate through the document P, the levels of the first voltage signal and the second voltage signal outputted from the light receiver 160 are both greater than the high voltage reference value. According to the look-up table, the document P is discriminated as a slide (i.e. the second document type) by the discriminating unit 180.

Moreover, if the high-intensity light beam and the low-intensity light beam are impenetrable to the document P, the voltages levels of the first voltage signal and the second voltage signal outputted from the light receiver 160 are both smaller than the low voltage reference value. According to the look-up table, the document P is discriminated as a photo paper (i.e. the third document type) by the discriminating unit 180.

Figure 3:
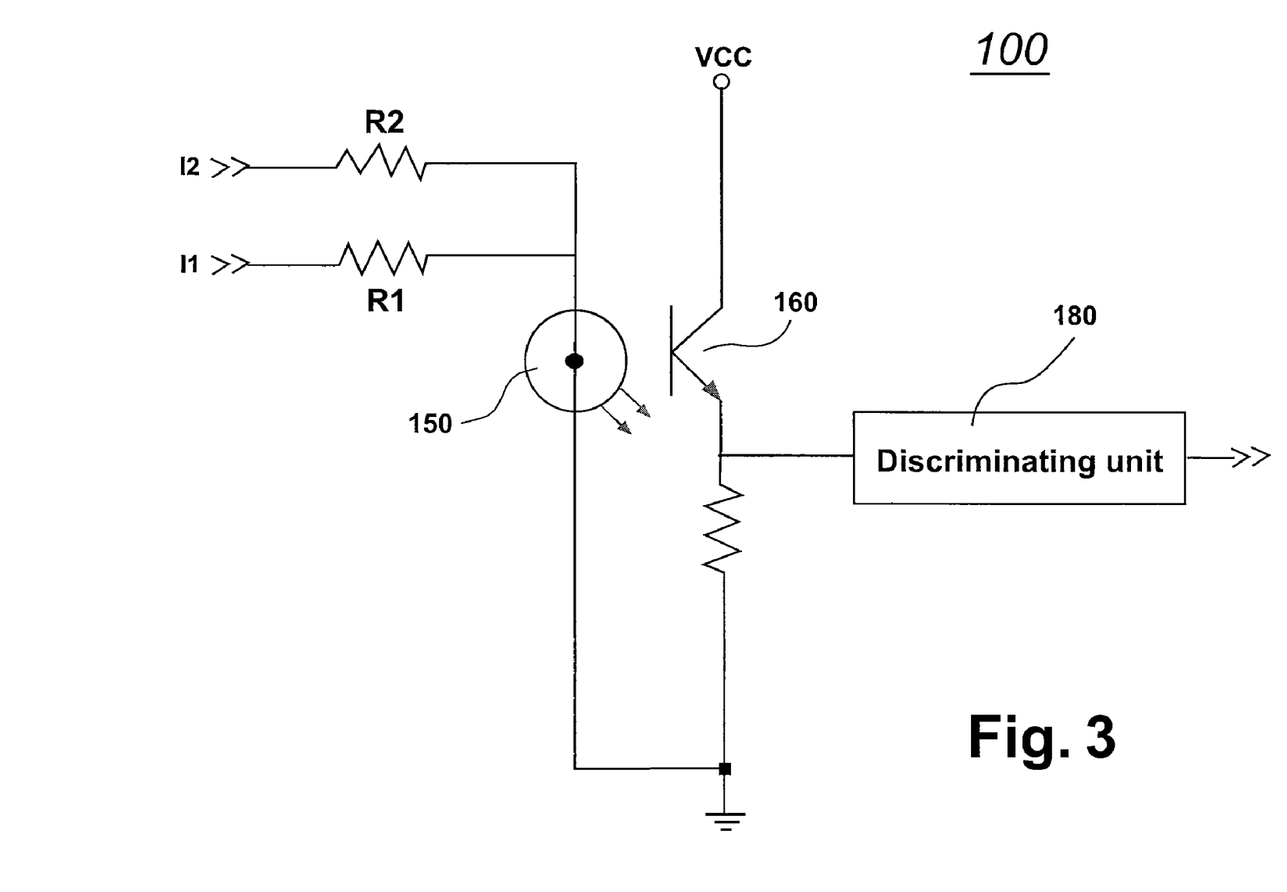
FIG. 3 is a schematic diagram of a circuit for discriminating document types by the automatic document feeder according to the first preferred embodiment of the present invention.

Referring to FIG. 3, a schematic diagram of a circuit for discriminating document types by the automatic document feeder of the first preferred embodiment is illustrated. As shown in FIG. 3, the light emitter 150 is coupled to a pair of resistors R1 and R2, which are connected with each other in parallel. In a case that a first current I1 flows through the resistor R1, the light emitter 150 generates a first intensity light beam. Whereas, in another case that a second current I2 flows through the resistor R2, the light emitter 150 generates a second intensity light beam. That is, the light beams of different intensities may be generated by adjusting the resistance values. It is noted that, however, those skilled in the art will readily observe that numerous modifications and alterations may be made while retaining the teachings of the invention. For example, the number of parallel-connected resistors may be increased in order to generate more light beams of different intensities. For example, if N parallel-connected resistors are coupled to the light emitter 150, the light emitter 150 may generate N light beams of different intensities and thus N voltage signals of different levels may be outputted to the discriminating unit 180. Under this circumstance, a series of experiments concerning the relationships of N different voltage values and (N+1) different document types are carried out to obtain a look-up table in advance. Likewise, according to the look-up table and the voltage signal V outputted from the light receiver 160, the document types may be discriminated by the discriminating unit 180.

Figure 4:
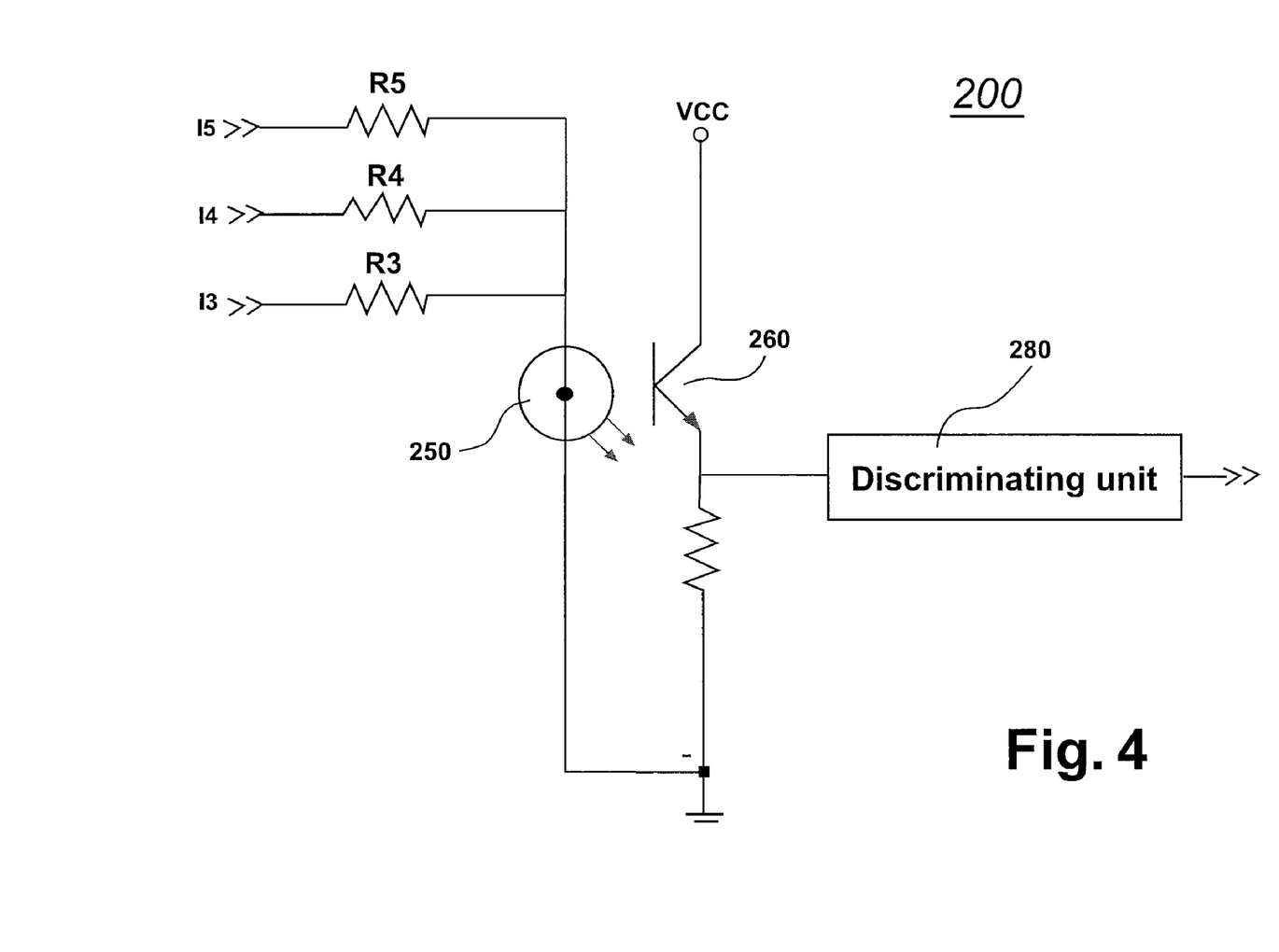
FIG. 4, a schematic diagram of another circuit for discriminating document types by an automatic document feeder according to a second preferred embodiment of the present invention.

Referring to FIG. 4, a schematic diagram of another circuit for discriminating document types by an automatic document feeder according to a second preferred embodiment of the present invention is illustrated. In this embodiment, component parts and elements corresponding to those of the first embodiment are designated by identical numeral references, and detailed description thereof is omitted. As shown in FIG. 4, the light emitter 250 is coupled to three resistors R3, R4 and R5, which are connected with each other in parallel. If a third current I3 flows through the resistor R3, the light emitter 250 generates a third intensity light beam. If a fourth current I4 flows through the resistor R4, the light emitter 250 generates a fourth intensity light beam. If a fifth current I5 flows through the resistor R5, the light emitter 250 generates a fifth intensity light beam. In this embodiment, the third intensity light beam is greater than the fourth intensity light beam in intensity, and the fourth intensity light beam is greater than the fifth intensity light beam in intensity. In response to the third intensity light beam, the fourth intensity light beam and the fifth intensity light beam, the light receiver 260 outputs a third voltage signal, a fourth voltage signal and a fifth voltage signal to the discriminating unit 280, respectively. For discriminating the document type, a series of experiments concerning the relationships between the high voltage reference value, the low voltage reference value and different document types are carried out to obtain a look-up table as shown in Table 2. The documents types shown in Table 2 include a first document type, a second document type, a third document type and a fourth document type, which are arranged in descending order of thickness. If the third, fourth and fifth intensity light beams are impenetrable to the document, the voltage levels of the third, fourth and fifth voltage signals outputted from the light receiver 160 are all smaller than the low voltage reference value. According to the look-up table sown in Table 2, the document is discriminated as the first document type by the discriminating unit 280. If the third intensity light beam penetrate through the document but the fourth and fifth intensity light beams is impenetrable to the document, the voltage level of the third signal is greater than the high voltage reference value but the levels of the fourth and fifth voltage signals outputted from the light receiver 160 are both smaller than the low voltage reference value. According to the look-up table sown in Table 2, the document is discriminated as the second document type by the discriminating unit 280. The rest may be deduced by analogy. By referring to FIG. 4 and Table 2, the extensive concepts of the automatic document feeder of the present invention are conceivable.

TABLE 2

| Third voltage signal | Fourth voltage signal | Sixth voltage signal | Document type |
|---|---|---|---|
| <low voltage reference value | <low voltage reference value | <low voltage reference value | First type |
| >high voltage reference value | <low voltage reference value | <low voltage reference value | Second type |
| >high voltage reference value | >high voltage reference value | <low voltage reference value | Third type |
| >high voltage reference value | >high voltage reference value | >high voltage reference value | Fourth type |

As previously described, the conventional automatic document feeder needs complicated circuitry for analyzing the light beam energy. On the contrast, as also shown in FIG. 3, the circuit for discriminating document types is very simply and thus the automatic document feeder of the present invention is more cost-effective. In the embodiment of FIG. 3, the criterion of discriminating the document types is based on the relationship between the outputted voltage levels, the high voltage reference value and the low voltage reference value. For clear discriminating document types, the resistance values of the resistors coupled to the light emitter should be adjusted such that the first intensity light beam and the second intensity light beam have precise intensities. In other words, by adjusting the resistance values of the resistors coupled to the light emitter, the outputted voltage levels are either greater than the high voltage reference value or smaller than the low voltage reference value. It is noted that, however, those skilled in the art will readily observe that numerous modifications and alterations of the discriminating unit may be made while retaining the teachings of the invention.

Figure 5:
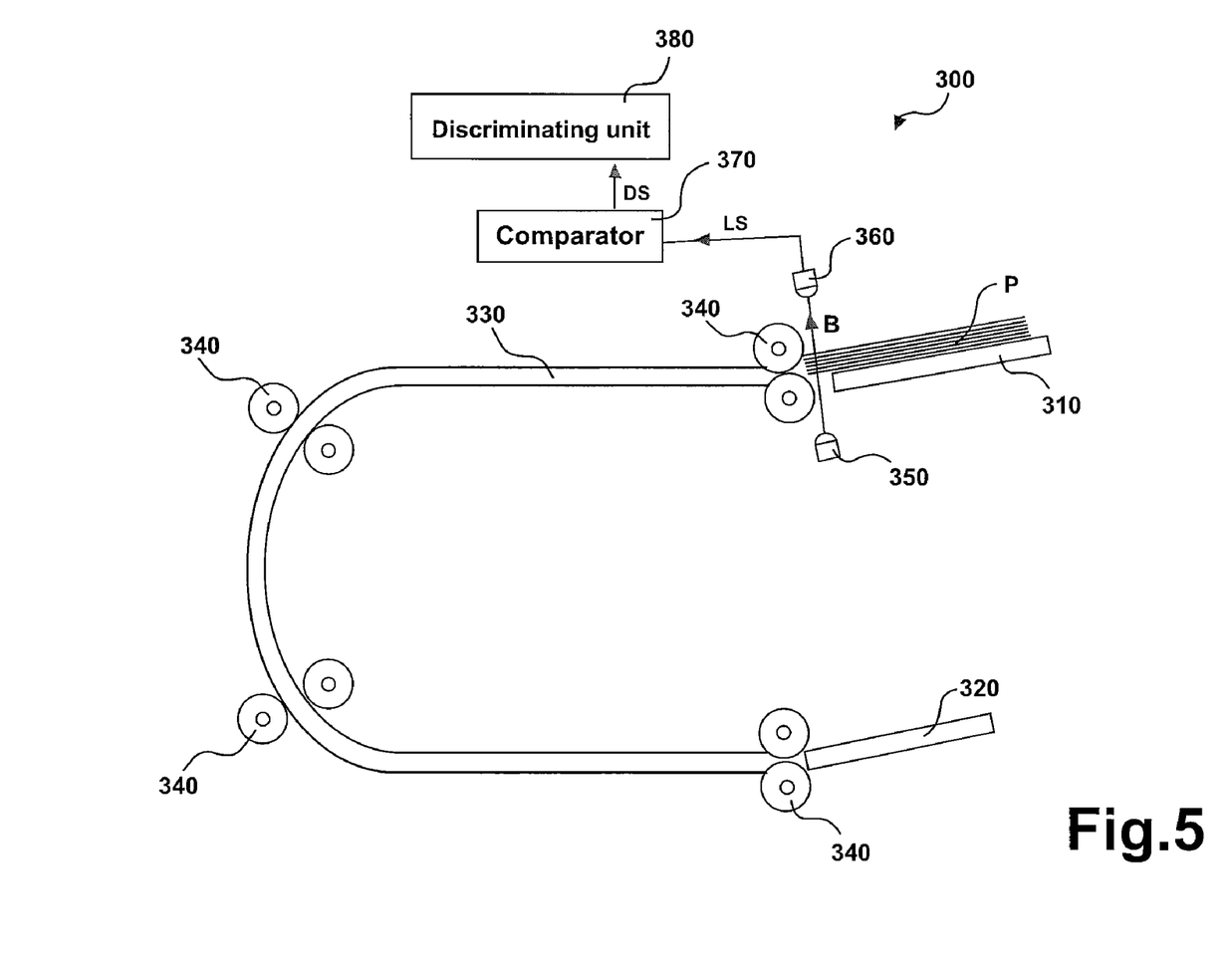
FIG. 5 is a schematic cross-sectional view of an automatic document feeder according to a third preferred embodiment of the present invention.

Referring to FIG. 5, a schematic cross-sectional view of an automatic document feeder according to a third preferred embodiment of the present invention is illustrated. The automatic document feeder 300 of FIG. 5 principally includes an input tray 310, an ejecting tray 320, a transfer path 330, several roller assemblies 340, a light emitter 350, a light receiver 360, a comparator 370 and a discriminating unit 380. The roller assemblies 340 include a pick-up roller assembly, a separation roller assembly, a transfer roller assembly and an ejecting roller assembly. In comparison with the first and second embodiments, the automatic document feeder 300 of FIG. 5 has an additional comparator 370 interconnected between the light receiver 360 and the discriminating unit 380. By means of the comparator 370, the voltage level outputted from the light receiver 360 is converted into either a high-level or a low-level logic value. In this embodiment, the high-level logic value and the low-level logic value are used as indexes of discriminating document type by the discriminating unit 380.

As shown in FIG. 5, the light emitter 350 and the light receiver 360 are arranged in the vicinity of the input tray 310 and the inlet of the transfer path 330. After the document P is placed on the input tray 310, the roller assemblies 340 transport the document P forwardly into the transfer path 330. During the document P is fed into the transfer path 330, the light beam B generated from the light emitter 350 is projected onto the document P. Depending on the type of the document P, the light beam B penetrates through the document P or is reflected by the document P. In a case that the document P is transparent, the light beam B penetrates through the document P to be received by the light receiver 360, and thus an optical signal LS is transmitted from the light receiver 360 to the comparator 370. In another case that the document P is opaque, the light beam B is reflected by the document P and fails to be received by the light receiver 360, so that no optical signal is transmitted from the light receiver 360 to the comparator 370. Regardless of whether the optical signal LS is transmitted from the light receiver 360 to the comparator 370, a logic level signal (DS) is outputted from the comparator 370 to the discriminating unit 380. If the light beam B is received by the light receiver 360 and the optical signal LS is transmitted from the light receiver 360 to the comparator 370, the logic signal DS outputted from the comparator 370 is a high logic level signal having a logic value "1". Whereas, if no optical signal is transmitted from the light receiver 360 to the comparator 370, the logic signal DS outputted from the comparator 370 is a low logic level signal having a logic value "0". For discriminating the document type, a series of experiments concerning the relationships of logic values and document types are carried out to obtain a look-up table in advance. The look-up table has been previously stored in the discriminating unit 380. The look-up table is shown in Table 3.

TABLE 3

| First logic level signal | Second logic level signal | Document type |
|---|---|---|
| logic value "0" | logic value "0" | Photo paper |
| logic value "1" | logic value "0" | Plain paper |
| logic value "1" | logic value "1" | Slide |

In this embodiment, the light emitter 350 may generate a high-intensity light beam and a low-intensity light beam. In response to the high-intensity light beam and the low-intensity light beam, the comparator 370 outputs a first level logic signal a second level logic signal to the discriminating unit 380, respectively. The look-up table has been previously stored in the discriminating unit 380. As shown in Table 3, a plain paper, a slide and a photo paper are indicated as a first document type, a second document type and a third document type, respectively. When the document P enters the illumination field of the light emitter 350, a high-intensity light beam generated from the light emitter 350 penetrates through the document P and the penetrative light beam is received by the light receiver 360. When the penetrative light beam is received by the light receiver 360, an optical signal LS is transmitted from the light receiver 360 to the comparator 370. In response to the optical signal LS, the first level logic signal is outputted from the comparator 370 to the discriminating unit 380. Meanwhile, the discriminating unit 380 realizes that the first level logic signal is a high logic level signal having a logic value "1". Subsequently, a low-intensity light beam is generated from the light emitter 350. If the low-intensity light beam fails to be received by the light receiver 360, no optical signal is transmitted from the light receiver 360 to the comparator 370. Meanwhile, the second level logic signal is outputted from the comparator 370 to the discriminating unit 380, and the discriminating unit 380 realizes that the second level logic signal is a low logic level signal having a logic value "0". According to the look-up table shown in Table 3, the document P is discriminated as a plain paper (i.e. the first document type) by the discriminating unit 380.

On the other hand, if the low-intensity light beam is able to penetrate through the document P, an optical signal LS is transmitted from the light receiver 360 to the comparator 370. In response to the optical signal LS, the second level logic signal is outputted from the comparator 370 to the discriminating unit 380. Meanwhile, the discriminating unit 380 realizes that the second level logic signal is a high logic level signal having a logic value "1". According to the look-up table shown in Table 3, the document P is discriminated as a slide (i.e. the second document type) by the discriminating unit 380.

Moreover, if the high-intensity light beam and the low-intensity light beam are impenetrable to the document P, the first level logic signal and second level logic signal outputted from the comparator 370 are both logic level signals (logic value "0"). According to the look-up table shown in Table 3, the document P is discriminated as a photo paper (i.e. the third document type) by the discriminating unit 380.

Figure 6:
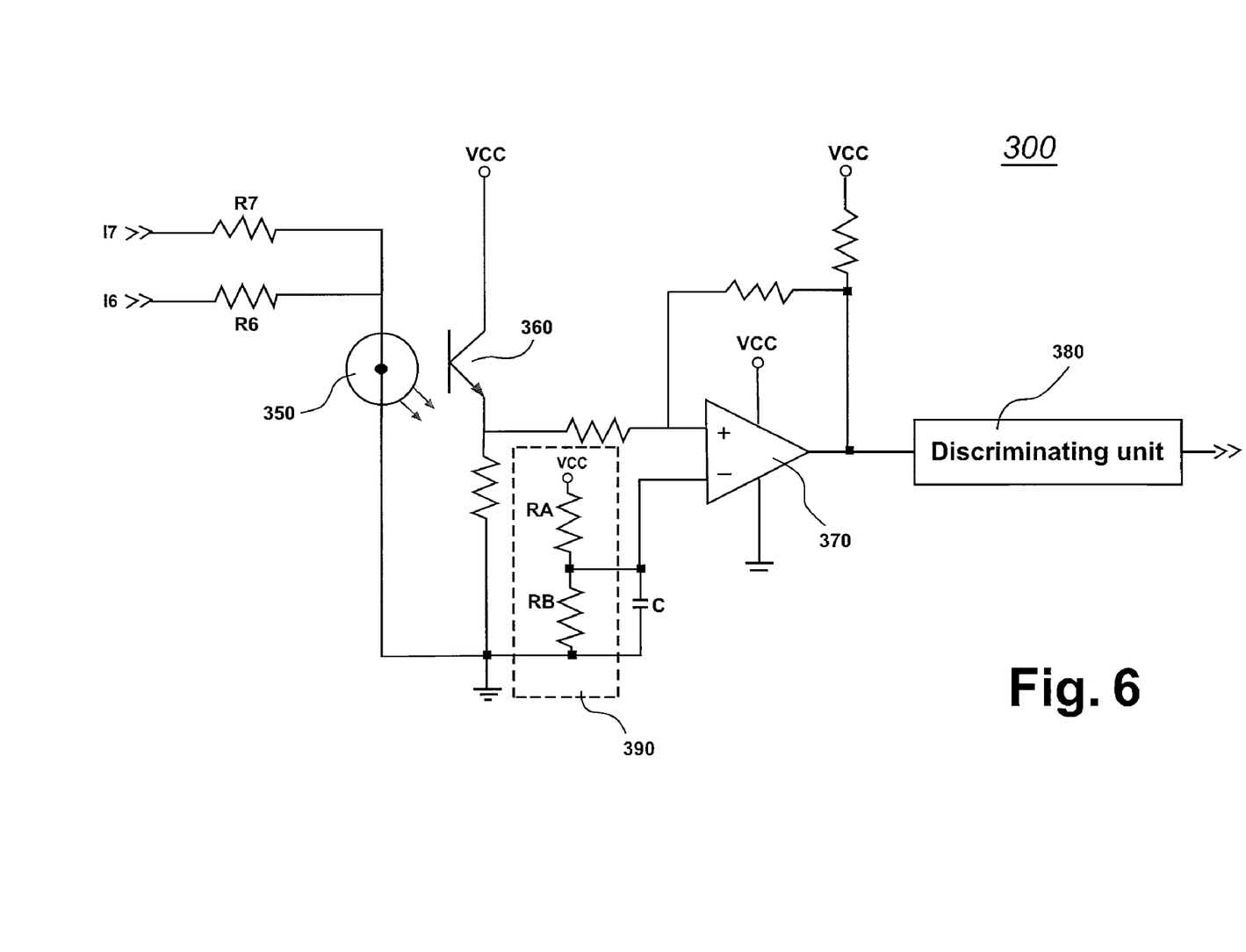
FIG. 6 is a schematic diagram of a circuit for discriminating document types by the automatic document feeder according to the third embodiment of the present invention.

Referring to FIG. 6, a schematic diagram of a circuit for discriminating document types by the automatic document feeder according to the third embodiment of the present invention is illustrated. As shown in FIG. 6, a bias circuit 390 is coupled to the negative input end of the comparator 370 for providing a bias voltage. The bias voltage is controlled by a driving voltage VCC, a first resistor RA and a second resistor RB. The capacitor C is served as a noise filter for reducing interference from noise. In addition, the light emitter 350 is coupled to a pair of resistors R6 and R7, which are connected with each other in parallel. In a case that a sixth current I6 flows through the resistor R6, the light emitter 350 generates a sixth intensity light beam. Whereas, in another case that a seventh current I7 flows through the resistor R7, the light emitter 350 generates a seventh intensity light beam. That is, the light beams of different intensities may be generated by adjusting the resistance values. Likewise, as described in the second preferred embodiment, the number of parallel-connected resistors may be increased in order to generate more light beams of different intensities. As a consequence, more document types may be distinguished and recognized.

In the prior art, the intensity of the light beam is adjustable. For discriminating the document type, a first intensity light beam is emitted to the document and the penetrative light beam is received by the light receiver 14 as shown in FIG. 1. If the exact document type is recognized by analyzing the energy of the first intensity light beam, the discriminating process is ended. Otherwise, a second intensity light beam is emitted to the document. These procedures are repeated by emitting other light beams of different intensities until the light beam having the optimal intensity and the exact document type are successfully recognized. Therefore, the circuitry of the control unit 50 is very complicated and the discriminating method is not user-friendly. On contrary, for discriminating the document type according to the present invention, the light emitter 340 (see FIG. 5 and the third preferred embodiment) may successively emit multiple light beams of different intensities on the same document to obtain corresponding voltage signals of different voltage levels. By means of the comparator, these voltage signals are converted into logic level signals having high/low logic values. Since the discriminating unit recognizes the exact document type by analyzing the high/low logic values, the circuitry of the discriminating unit is simplified and cost-effective.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic document feeder for feeding a document, said automatic document feeder comprising:
    an input tray for placing said document thereon;
    a transfer path severing as a passageway of said document;
    a roller assembly for transporting said document through said transfer path;
    an ejecting tray for supporting said document ejected from said transfer path;
    a light emitter for successively emitting multiple light beams of different intensities to said document;
    a light receiver electrically connected to said light emitter for receiving said multiple light beams penetrating through said document, and outputting corresponding voltage signals, wherein said voltage signals have a first voltage level and a second voltage level; and
    a discriminating unit electrically connected to said light receiver for discriminating document types, said discriminating unit having been previously stored therein a look-up table concerning the relationships between a high voltage reference value, a low voltage reference value and said document types, wherein said document is discriminated as a first document type by said discriminating unit if said first voltage level is greater than said high voltage reference value and said second voltage level is smaller than said low voltage reference value, said document is discriminated as a second document type by said discriminating unit if said first voltage level and said second voltage level are both greater than said high voltage reference value, and said document is discriminated as a third document type by said discriminating unit if said first voltage level and said second voltage level are both smaller than said low voltage reference value.

2. The automatic document feeder according to claim 1 wherein said first document type is a plain paper, said second document type is a slide, and said third document type is a photo paper.

3. The automatic document feeder according to claim 1 wherein said light emitter is a light emitting diode (LED) or an infrared light emitter.

4. The automatic document feeder according to claim 1 wherein said light receiver is a photo transistor.

5. An automatic document feeder for feeding a document, said automatic document feeder comprising:
    an input tray for placing said document thereon;
    a transfer path severing as a passageway of said document;
    a roller assembly for transporting said document through said transfer path;
    an ejecting tray for supporting said document ejected from said transfer path;
    a light emitter for successively emitting multiple light beams of different intensities to said document;
    a light receiver electrically connected to said light emitter for receiving said multiple light beams penetrating through said document;
    a comparator electrically connected to said light receiver and outputting corresponding logic level signals in response to reception of said light beams by said light receiver, wherein said logic level signals have a first logic level and a second logic level; and a discriminating unit electrically connected to said comparator for discriminating document types, said discriminating unit having been previously stored therein a look-up table concerning the relationships between a high logic value, a low logic value and said document types, wherein said document is discriminated as a first document type by said discriminating unit if said first logic level is equal to said high logic value and said second logic level is equal to said low logic value, said document is discriminated as a second document type by said discriminating unit if each of said first logic level and said second logic level is equal to said high logic value, and said document is discriminated as a third document type by said discriminating unit if each of said first logic level and said second logic level is equal to said low logic value.

6. The automatic document feeder according to claim 5 wherein said first document type is a plain paper, said second document type is a slide, and said third document type is a photo paper.

7. The automatic document feeder according to claim 5 wherein said light emitter is a light emitting diode (LED) or an infrared light emitter.

8. The automatic document feeder according to claim 5 wherein said light receiver is a photo transistor.

9. A method for discriminating a type of a document to be fed into an automatic document feeder, said method comprising steps of:
   successively emitting multiple light beams of different intensities to said document, wherein said multiple light beams include a first intensity light beam and a second intensity light beam;
   detecting whether said light beams penetrate through said document; and
   discriminating said type of said document according the detecting result, wherein said document is discriminated as a first document type if said first intensity light beam penetrates through said document but said second intensity light beam is impenetrable to said through said document, said document is discriminated as a second document type if both of said first intensity light beam and said second intensity light beam penetrate through said document, and said document is discriminated as a third document type if both of said first intensity light beam and said second intensity light beam are impenetrable to said through said document.

10. The method according to claim 9 wherein said first document type is a plain paper, said second document type is a slide, and said third document type is a photo paper.

* * * * *